Feb. 7, 1933.    A. KREIDLER    1,896,449
CAM GEAR FOR INTERNAL COMBUSTION ENGINES
Filed March 12, 1931
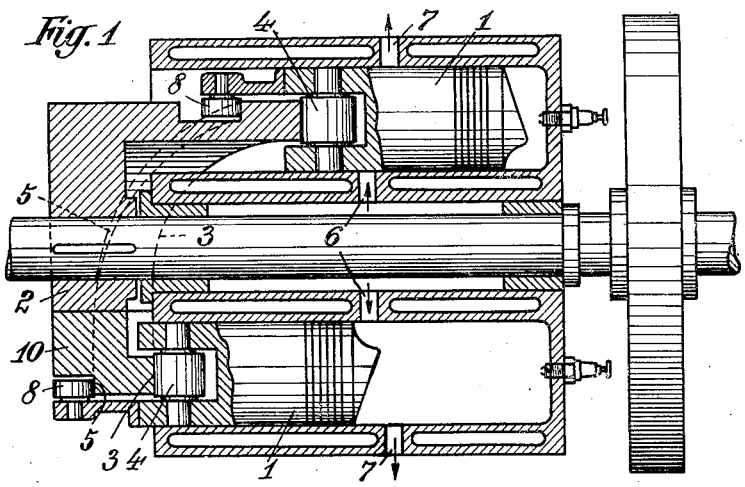
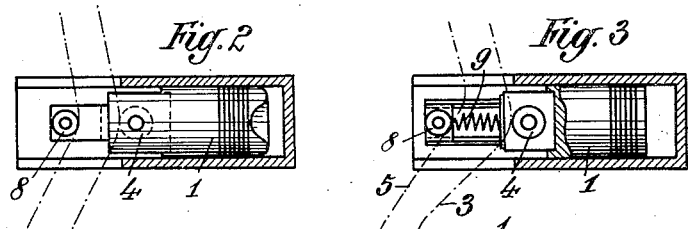
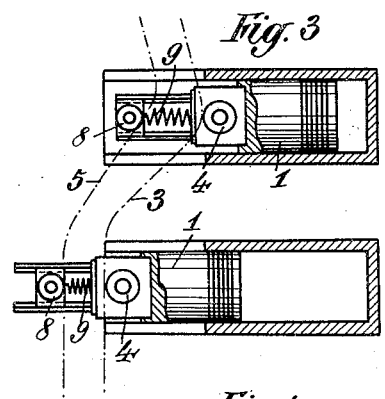
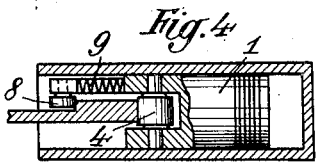
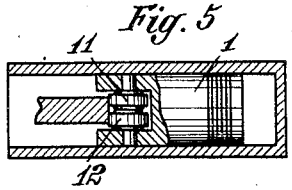
Inventor:
A. Kreidler
By: Marks Klein
Attys.

Patented Feb. 7, 1933

1,896,449

UNITED STATES PATENT OFFICE

ANTON KREIDLER, OF STUTTGART, WURTEMBERG, GERMANY

CAM GEAR FOR INTERNAL COMBUSTION ENGINES

Application filed March 12, 1931, Serial No. 522,119, and in Germany March 17, 1930.

The present invention relates to internal combustion engines (explosion engines, Diesel engines etc.) of the known type wherein the piston motion is transformed into a rotary motion of the driving shaft, by a cam gear.

Cam gears suffer from the disadvantage that when an engine is running rapidly, or when there is a mis-fire, the piston does not always follow the prescribed cam track. Attempts have been made, therefore, to cause the piston to bear on the cam track by means of springs or to guide it, by means of a pin, in a positive manner, between two parallel guiding cams forming a groove. Both of these methods give rise to inconveniences. When springs are used, very long springs are required owing to the piston stroke, and the springs very soon become fatigued. In the case of positive guiding by means of a pin, seizure or even fracture of the pin is readily produced by the action of the high working pressure of the piston.

These disadvantages are obviated by the present invention. On the cam disc, separate cam tracks are so arranged at different places that the track which is subjected to the high piston pressure faces towards the working piston, while one or more other cams having oppositely directed guiding tracks facing away from the piston, and on which runs a roller firmly secured to the piston, pull the piston outwardly when necessary.

In order to secure undisturbed running of the piston on the cam track facing it, the arrangement is so contrived that the cam track facing away from the piston does not run parallel in all places with the track facing the piston. This renders it possible, more particularly on the very steep working cam track on which the piston performs work, to bring the piston, in the case of a mis-fire, to the outer stroke position by means of the less steep cam track facing away from the piston.

The running of the piston on the cam tracks is made still more reliable and, in particular less noisy, if the roller running on the cam track facing away from the piston is connected to the piston not rigidly, but resiliently, thereby causing the piston to glide smoothly over all the elevations and depressions of the cam track facing the piston.

If, in large engines, the cam track facing the piston and subjected to the full pressure of the piston, has to be made rather wide, the single cam roller of the piston is replaced by a plurality of adjacently disposed rollers running independently of each other. The rollers located towards the outside of the cam track can then run at a greater speed than the rollers on the inside. The rollers are sunk in the piston in order that the lateral pressure exerted on the cylinder wall by the piston will not be too great.

In cam gears, it is found to be a disadvantage that the piston can only be taken out of the cylinder after removing the cam disc as a whole from the driving shaft. In order to simplify the removal of the piston, the cam disc is provided, according to the invention, with a detachable portion, after removing which the piston can be taken out of the cylinder through the opening thereby produced.

A cam gear according to the invention is shown by way of constructional example in the accompanying drawing, wherein—

Figure 1 shows in longitudinal section the cam gear as applied to a two-stroke cycle internal combustion engine, having electrical ignition.

Figure 2 shows in a section turned through 90° a working piston with its guide rollers on the cam tracks.

Figure 3 shows, in the event of a mis-fire, a piston being guided over the steep working cam track by means of the cam track, which faces away from the piston and is not parallel with the cam track facing towards the piston.

Figure 4 shows a construction having a cam roller, for the cam track facing away from the piston, resiliently connected to the piston.

Figure 5 shows the construction of a piston having a plurality of sunk cam rollers.

Figure 6 shows the cam disc with the cover portion removed.

In Figure 1, 1 denotes the piston, 2 is the cam disc mounted on the driving shaft, 3 is the cam track facing towards the piston, and 5 is the cam track facing away from the piston. 4 and 8 are the rollers for the cam tracks 3 and 5, respectively.

The two-stroke cycle internal combustion engine illustrated by way of example functions in the following manner: After the ignition has occurred, the piston bears at 3 upon the steep working face turned towards it, thus setting the shaft in rotary motion. After reaching the bottom dead centre, the piston under the action of the suitable cam track has uncovered first the outlet opening 7 and then the inlet opening 6. The fresh gas mixture, or in Diesel engines, the scavenging air, enters and at the same time expels the products of combustion through the outlet 7. Under the action of a suitable cam track, the backwardly moving piston then covers both openings and compresses the contents of the cylinder, whereupon the cycle of operations for the piston recommences.

The movement described in the foregoing which, during one revolution of the engine is executed by the piston on the cam track 3 facing towards it, is assured by means of the cam track facing away from the piston. The said cam track 5 is not parallel in all places with the cam track facing the piston, thus enabling the piston to be brought to the outer position in the case of a mis-fire, as will be seen by reference to Figure 3. In the said Figure 3, 3 is the cam track facing towards the piston, and 5 the cam track facing away from the piston. Since, in the case of a mis-fire, the piston 1 would not reach the outer piston position, the less steep cam track 5, facing away from the piston engages the roller 8 and pulls the piston outwards along a gently inclined track.

This guiding of the piston takes place still more smoothly if the cam roller 8 facing away from the piston is resiliently suspended from the piston, as will be seen by reference to Figures 3 and 4. Then, when the cam tracks 3 and 5 are divergent, the spring 9 tensions the roller 8 and the piston will thus be pulled more firmly against the cam track 3 facing towards it, which it now properly follows.

Figure 6 shows the cam disc 2 with the detachable piece 10. The piston can be readily withdrawn from the cylinder through the opening provided by the removal of the piece 10.

Having now particularly described and ascertained the nature of my said invention and in what manner the same is to be performed, I declare that what I claim is:—

1. A cam gear for combustion engines comprising a cylinder, a working piston therein, a rotatable cam disc having its axis disposed parallel to the direction of movement of said piston, opposed cam tracks on said disc, one of said tracks facing in the direction of said piston and the other track facing outwardly in the direction opposite said piston, rollers carried by said piston and engaging the respective tracks, the inclined portions of the cam track which face outwardly from the piston having a lesser degree of steepness than the steeply inclined portions of the cam track which faces the piston whereby the latter, in the case of misfire, is moved to its outstroke position by coaction of one of said rollers with the less steeply inclined out-facing track.

2. A cam gear as claimed in claim 1, characterized by the provision of means resiliently connecting the roller engaging the second mentioned track with the piston.

3. A cam gear as claimed in claim 1, characterized in that said tracks are removable from the body of the cam disc to permit withdrawal of the piston from the cylinder.

In testimony whereof I affix my signature.

ANTON KREIDLER.